(12) United States Patent
Takeuchi

(10) Patent No.: US 10,018,517 B2
(45) Date of Patent: Jul. 10, 2018

(54) OPTICAL FIBER TEMPERATURE DISTRIBUTION MEASURING DEVICE

(71) Applicant: YOKOGAWA ELECTRIC CORPORATION, Musashino-shi, Tokyo (JP)

(72) Inventor: Nobuaki Takeuchi, Tokyo (JP)

(73) Assignee: YOKOGAWA ELECTRIC CORPORATION, Musashino-shi, Tokyo (JP)

(*) Notice: Subject to any disclaimer, the term of this patent is extended or adjusted under 35 U.S.C. 154(b) by 150 days.

(21) Appl. No.: 14/740,517

(22) Filed: Jun. 16, 2015

(65) Prior Publication Data
US 2016/0003687 A1  Jan. 7, 2016

(30) Foreign Application Priority Data

Jul. 7, 2014  (JP) ............... 2014-139570

(51) Int. Cl.
| | | |
|---|---|---|
| *G01J 5/08* | (2006.01) | |
| *G01K 3/06* | (2006.01) | |
| *G01K 3/14* | (2006.01) | |
| *G01K 13/00* | (2006.01) | |
| *G01K 11/32* | (2006.01) | |

(52) U.S. Cl.
CPC ........ *G01K 11/32* (2013.01); *G01K 2011/322* (2013.01); *G01K 2011/324* (2013.01)

(58) Field of Classification Search
CPC .. G01K 3/14; G01K 3/10; G01K 3/02; G01K 3/04; G01K 15/00; G01K 3/06; G01K 13/00; G01J 1/04; G01J 5/08

USPC ....... 374/130, 131, 137, 110, 1, 2, 102, 166; 356/43, 44
See application file for complete search history.

(56) References Cited

U.S. PATENT DOCUMENTS

| | | | | |
|---|---|---|---|---|
| 5,054,935 A | | 10/1991 | Tanabe et al. | |
| 5,102,232 A | * | 4/1992 | Tanabe ................. | G01K 11/32 250/227.14 |
| 5,113,277 A | * | 5/1992 | Ozawa ................. | G01K 11/32 374/E11.015 |
| 5,530,433 A | * | 6/1996 | Morita ................. | G08B 29/185 250/573 |
| 6,188,971 B1 | * | 2/2001 | Kelly ................... | G01D 3/022 340/870.21 |
| 6,227,702 B1 | * | 5/2001 | Yamada ................ | G01J 5/041 266/88 |
| 8,858,069 B2 | * | 10/2014 | Agawa ................. | G01K 11/32 374/1 |

(Continued)

FOREIGN PATENT DOCUMENTS

| | | | | |
|---|---|---|---|---|
| CN | 101825498 B | * | 3/2012 | ............ G01K 11/32 |
| JP | 0209938 A | * | 4/1990 | |

(Continued)

*Primary Examiner* — Gail Kaplan Verbitsky
(74) *Attorney, Agent, or Firm* — Sughrue Mion, PLLC

(57) ABSTRACT

An optical fiber temperature distribution measuring device includes: an optical fiber as a sensor; a calculation control unit for measuring a temperature distribution along the optical fiber based on an intensity ratio between Stokes light and anti-Stokes light of backward Raman scattered light from the optical fiber; and a temperature correction unit for correcting the temperature distribution by using temperature dependence of a loss difference between the Stokes light and the anti-Stokes light.

5 Claims, 7 Drawing Sheets

(56) References Cited

U.S. PATENT DOCUMENTS

| | | | | |
|---|---|---|---|---|
| 9,046,425 B2* | 6/2015 | Agawa | ................... | G01K 11/32 |
| 9,631,983 B2* | 4/2017 | Oishi | ................. | G01M 11/3109 |
| 2006/0215971 A1* | 9/2006 | Ramos | ................... | G01K 11/32 |
| | | | | 385/100 |
| 2006/0239330 A1* | 10/2006 | Yamate | ................. | G01K 11/32 |
| | | | | 374/161 |
| 2009/0240455 A1* | 9/2009 | Fromme | ................ | G01K 11/32 |
| | | | | 702/85 |
| 2012/0039359 A1* | 2/2012 | MacDougall | .......... | G01K 11/32 |
| | | | | 374/161 |
| 2013/0100984 A1* | 4/2013 | Agawa | ................... | G01K 11/32 |
| | | | | 374/161 |
| 2014/0241396 A1* | 8/2014 | Shida | .................... | G01K 11/32 |
| | | | | 374/161 |
| 2014/0321498 A1* | 10/2014 | Matsumoto | .......... | G01K 15/005 |
| | | | | 374/1 |
| 2015/0233767 A1* | 8/2015 | Cedilnik | ............... | G01J 3/4412 |
| | | | | 250/341.1 |
| 2015/0330844 A1* | 11/2015 | Oishi | ................. | G01M 11/3109 |
| | | | | 356/73.1 |
| 2016/0327415 A1* | 11/2016 | Uno | ................... | G01D 5/35361 |

FOREIGN PATENT DOCUMENTS

| | | | |
|---|---|---|---|
| JP | 3-108627 A | | 5/1991 |
| JP | 5-346353 A | | 12/1993 |
| JP | 2004252519 A | * | 9/2004 |
| JP | 2006023260 A | * | 1/2006 |
| JP | 2008-249515 A | | 10/2008 |
| JP | 2012242124 A | * | 12/2012 |

* cited by examiner

US 10,018,517 B2

OPTICAL FIBER TEMPERATURE DISTRIBUTION MEASURING DEVICE

CROSS-REFERENCE TO RELATED APPLICATION

This application claims priority from Japanese Patent Application No. 2014-139570 filed with the Japan Patent Office on Jul. 7, 2014, the entire content of which is hereby incorporated by reference.

BACKGROUND

1. Technical Field

An embodiment of the present disclosure relates to an optical fiber temperature distribution measuring device using an optical fiber as a sensor.

2. Description of the Related Art

Optical fiber temperature distribution measuring devices are a type of distributed measuring devices using an optical fiber as a sensor. The optical fiber temperature distribution measuring device is configured to measure a temperature distribution along the optical fiber. This technique utilizes backscattered light occurring inside an optical fiber. Note that an optical fiber temperature distribution measuring device is also referred to as a DTS (Distributed Temperature Sensor) as necessary in the description below.

Types of backscattered light include Rayleigh scattered light, Brillouin scattered light, Raman scattered light, and the like. Temperature measurements utilize backward Raman scattered light, which has a high temperature dependence. A temperature measurement is performed through wavelength separation of the backward Raman scattered light. Backward Raman scattered light includes anti-Stokes light AS whose wavelength is shorter than that of incident light, and Stokes light ST whose wavelength is longer than that of incident light.

An optical fiber temperature distribution measuring device measures the intensity Ias of anti-Stokes light and the intensity Ist of Stokes light to calculate the temperature based on the intensity ratio therebetween, and further produces and displays the temperature distribution along the optical fiber. Optical fiber temperature distribution measuring devices have been used in fields such as temperature control in plant facilities, disaster prevention-related investigations and researches, air-conditioning for power plants and large buildings, and the like.

Documents in this field include JP-A-2008-249515, for example.

SUMMARY

An optical fiber temperature distribution measuring device includes: an optical fiber as a sensor; a calculation control unit for measuring a temperature distribution along the optical fiber based on an intensity ratio between Stokes light and anti-Stokes light of backward Raman scattered light from the optical fiber; and a temperature correction unit for correcting the temperature distribution by using temperature dependence of a loss difference between the Stokes light and the anti-Stokes light.

DESCRIPTION OF THE EMBODIMENTS

Figure 1:
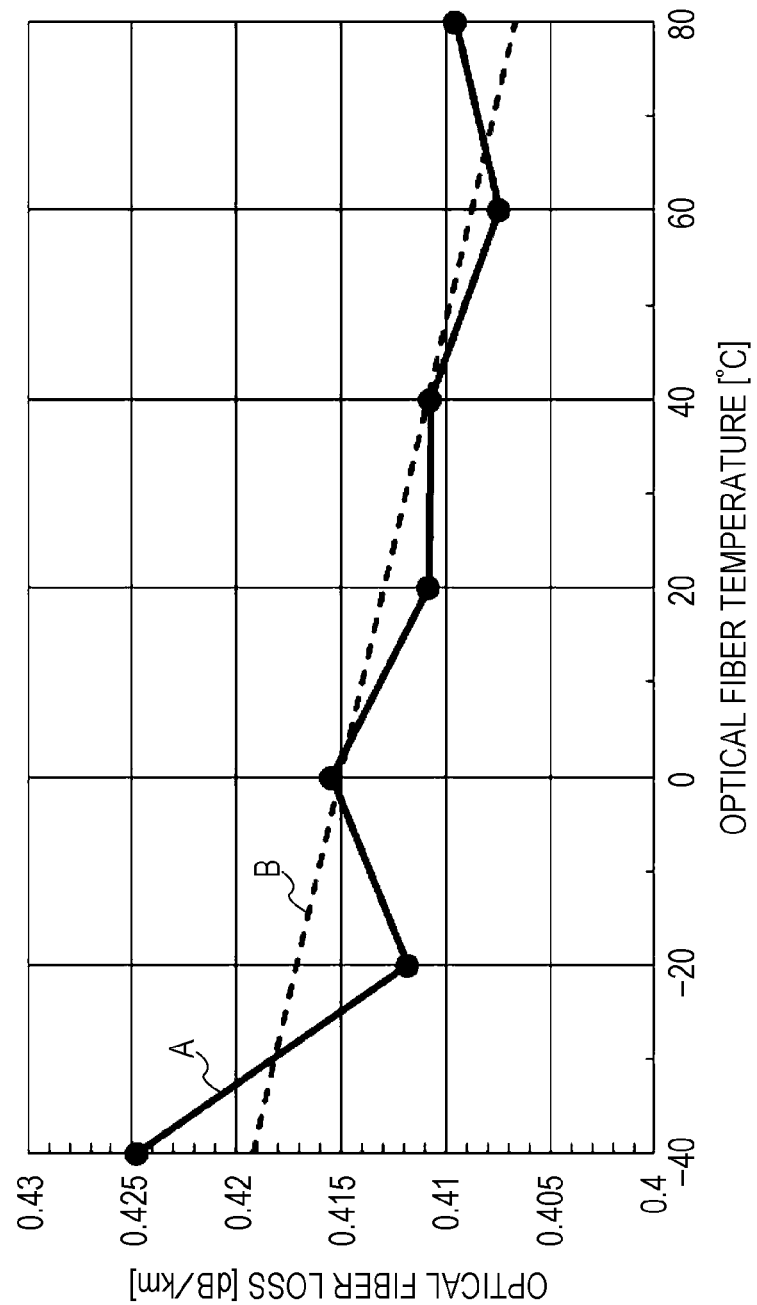
FIG. 1 is a graph showing an example optical fiber temperature-loss characteristic.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 6:
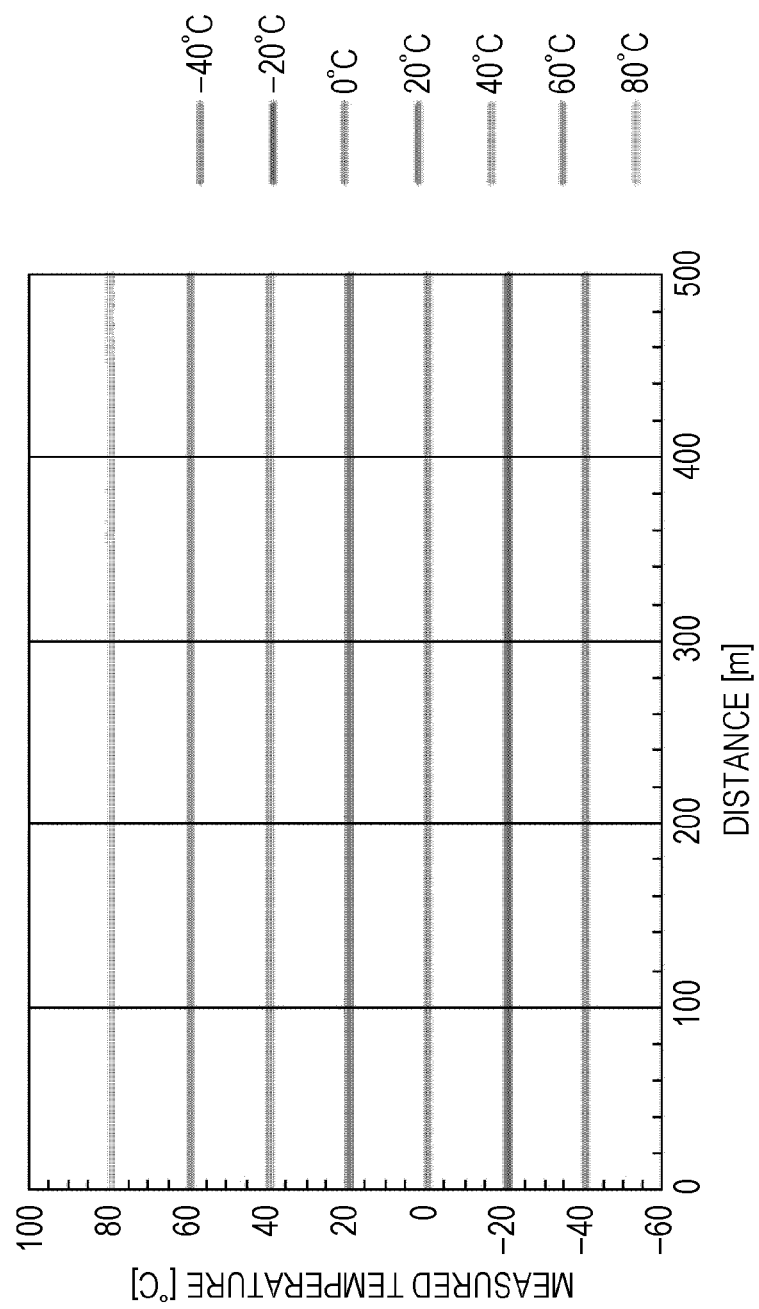
FIG. 6 is a graph showing an example temperature distribution measurement performed by an ordinary DTS.

FIG. 6 is a graph showing an example temperature distribution measurement performed by an ordinary DTS. In this measurement, the temperature is assumed to be constant within a range of −40° C. to +80° C. across the entire length of the optical fiber. The loss correction (loss calibration) of the optical fiber was performed while the temperature of the optical fiber was 20° C. FIG. 6 shows, on the same graph, measurement results of temperature distribution for seven different temperatures of the optical fiber. In the example shown in FIG. 6, the optical fiber temperatures measured each appear to be constant along the length direction of the optical fiber (each temperature distribution appears to be horizontal).

Figure 7:
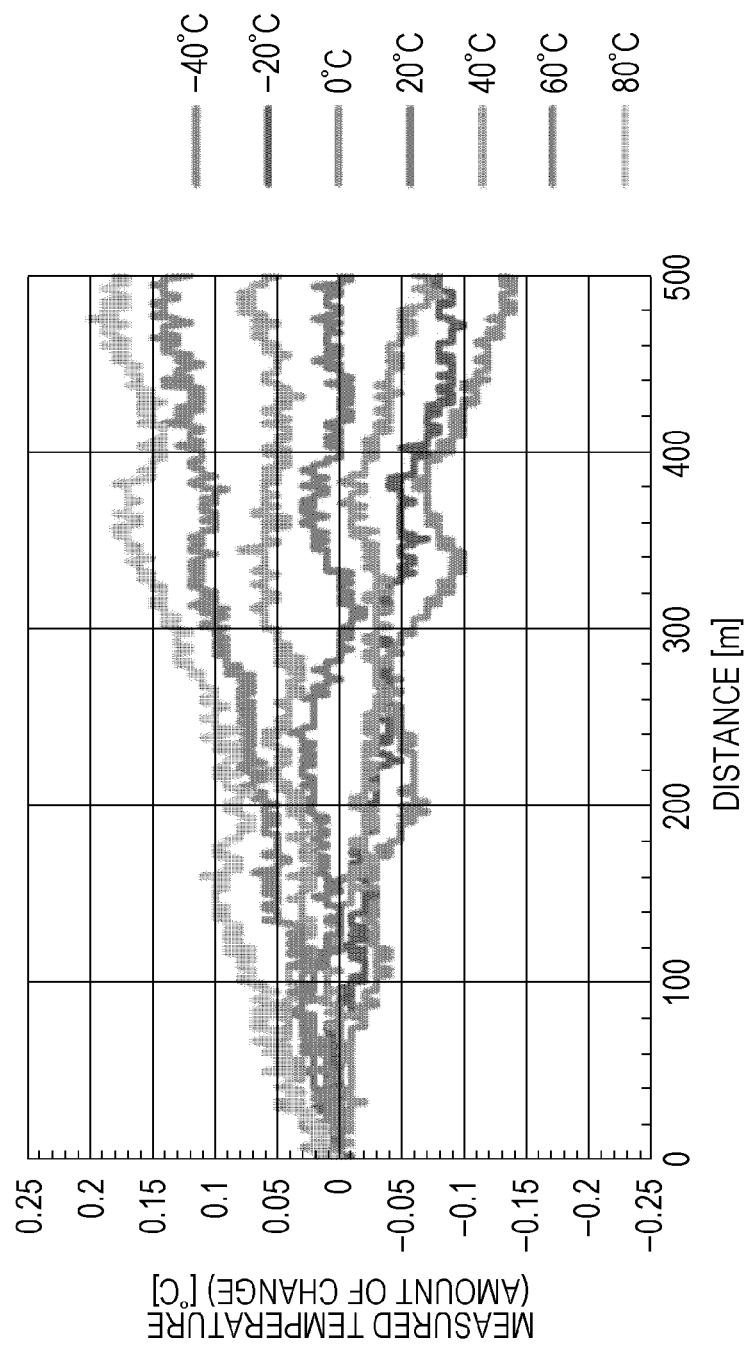
FIG. 7 shows the graph of FIG. 6, enlarged along its vertical axis.

FIG. 7 shows the graph of FIG. 6, enlarged along its vertical axis. When enlarged along its vertical axis, it can be seen from FIG. 7 that each temperature distribution measurement is not flat against distance (there is a gradient (measurement error) to the temperature distribution waveform). It is also clear that the gradient of the temperature distribution waveform varies depending on the temperature of the optical fiber. Note that FIG. 7 uses offsets such that each temperature starts from 0° C. at the distance of 0 m so as to facilitate the understanding of temperature fluctuations for different temperatures. Gentle undulations of each waveform represent actual temperature distributions, whereas small fluctuations represent DTS noise.

An improved DTS will also measure the variation of the gradient of the temperature distribution waveform depending on the temperature change of the optical fiber. Therefore, even if a temperature-corrected optical fiber is used, it is difficult to measure an accurate temperature depending on the distance (position) along the optical fiber.

Typically, the optical fiber temperature correction (optical fiber loss correction) is performed while the temperature of the optical fiber is set to a certain temperature. As shown in FIG. 7, the temperature distribution is not flat. Nevertheless, the temperature distribution measurement error (temperature measurement error) is at most about 0.2° C. at the optical fiber length of 500 m. This temperature measurement error remains latent for the following reasons.

a) Due to the poor measurement precision of a DTS, temperature measurement errors of 0.2° C. have not been observed.

b) Due to the short measurement distance of a DTS, temperature measurement errors have not been significant even when the temperature distribution is not accurate.

However, if the temperature measurement precision improves as the noise of a DTS is reduced, even a slight temperature measurement error significantly influences the measurement performance of a DTS.

Moreover, as is clear from the characteristic graph of FIG. 7, the temperature distribution waveform is not flat but has a gradient even though a uniform temperature is measured. Therefore, the temperature measurement error becomes more significant as the optical fiber length increases. For example, in the example of FIG. 7, the temperature measurement error is 0.2° C. at the optical fiber length of 500 m. Therefore, at the optical fiber length of 50 km, the temperature measurement error can be estimated to be 100 times higher, i.e., 20° C. That is, with a great optical fiber length, the temperature measurement precision deteriorates significantly.

An object of the present disclosure is to provide an optical fiber temperature distribution measuring device capable of correcting variations in the loss dependent on the temperature of an optical fiber, and capable of measuring an unknown temperature distribution with a high precision.

An optical fiber temperature distribution measuring device (the present measurement device) according to one embodiment of the present disclosure includes: an optical fiber as a sensor; a calculation control unit for measuring a temperature distribution along the optical fiber based on an intensity ratio between Stokes light and anti-Stokes light of backward Raman scattered light from the optical fiber; and a temperature correction unit for correcting the temperature distribution by using temperature dependence of a loss difference between the Stokes light and the anti-Stokes light.

In the present measurement device, the temperature correction unit may include an optical fiber loss correction temperature storing unit for storing a temperature of the optical fiber at a point in time when a loss correction value of the optical fiber is obtained.

In the measurement device, the temperature correction unit may include an optical fiber loss temperature characteristic storing unit for storing a temperature characteristic of a loss value of the optical fiber.

In the measurement device, the temperature correction unit may further include: an optical fiber loss correction value storing unit for storing a loss correction value of the optical fiber; and a temperature correction calculation unit for correcting the temperature distribution by using the loss correction value of the optical fiber.

In the measurement device, the temperature correction unit may further include a loss correction value calculation unit for correcting the temperature distribution by using the temperature dependence of the loss difference between the Stokes light and the anti-Stokes light based on the temperature of the optical fiber at the point in time when the loss correction value of the optical fiber is obtained, the temperature characteristic of the loss value of the optical fiber, and the temperature distribution corrected by the temperature correction calculation unit.

The measurement device may further includes an optical branching device for receiving the backward Raman scattered light and separating the backward Raman scattered light into the Stokes light and the anti-Stokes light.

With the present measurement device, it is possible to simplify the temperature correcting process and to correct the temperature with a high precision.

An embodiment of the present disclosure will now be described in detail with reference to the drawings.

Figure 2:
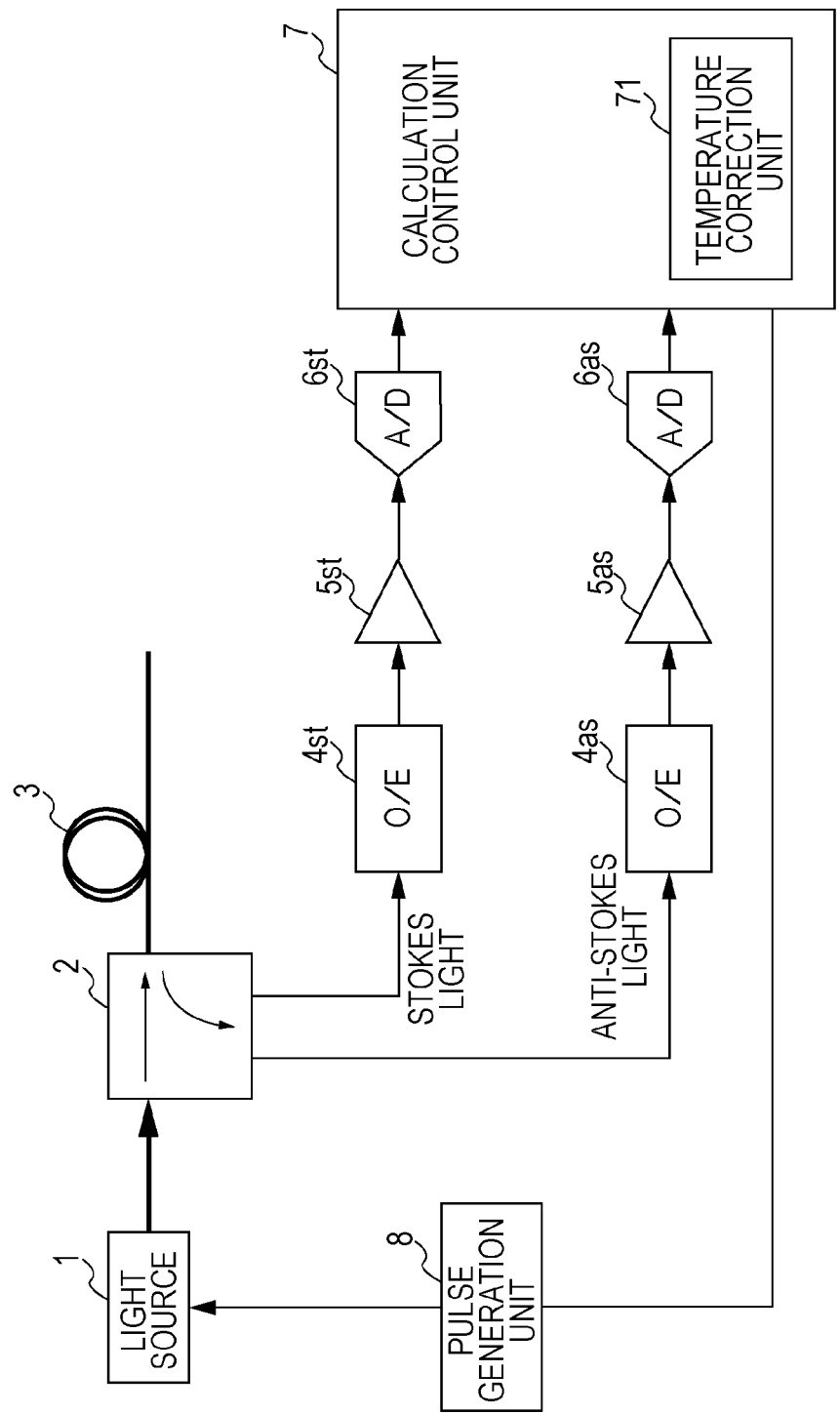
FIG. 2 is a block diagram showing a configuration of an optical fiber temperature distribution measuring device according to an embodiment.

FIG. 2 is a block diagram showing a configuration of an optical fiber temperature distribution measuring device of the present embodiment (the present measurement device). As shown in FIG. 2, the present measurement device includes a light source 1, an optical branching device 2, an optical fiber 3, an optoelectronic converter (hereinafter referred to as an O/E converter) 4$st$, an O/E converter 4$as$, an amplifier 5$st$, an amplifier 5$as$, an A/D converter 6$st$, an A/D converter 6$as$, a calculation control unit 7, and a pulse generation unit 8.

The light source 1 is connected to the input end of the optical branching device 2. The optical fiber 3 is connected to the input/output end of the optical branching device 2. The O/E converter 4$st$ is connected to one output end of the optical branching device 2. The O/E converter 4$as$ is connected to the other output end of the optical branching device 2.

The output terminal of the O/E converter 4$st$ is connected to the calculation control unit 7 through the amplifier 5$st$ and the A/D converter 6$st$. The output terminal of the O/E converter 4$as$ is connected to the calculation control unit 7 through the amplifier 5$as$ and the A/D converter 6$as$. Note that the calculation control unit 7 is connected to the light source 1 through the pulse generation unit 8.

The light source 1 may be a laser diode, for example. The light source 1 outputs pulsed light corresponding to the timing signal from the calculation control unit 7, which is input through the pulse generation unit 8. The optical branching device 2 has an input end, an input/output end, and two output ends. The input end of the optical branching device 2 receives pulsed light output from the light source 1. The input/output end of the optical branching device 2 outputs pulsed light toward the optical fiber 3. The input/output end of the optical branching device 2 also receives backward Raman scattered light occurring inside the optical fiber 3. The optical branching device 2 performs wavelength separation of the received backward Raman scattered light into Stokes light ST and anti-Stokes light AS. The input end of the optical fiber 3 receives pulsed light output from the optical branching device 2. The backward Raman scattered light occurring inside the optical fiber 3 is output from the input end of the optical fiber 3 toward the optical branching device 2.

The O/E converters 4$st$ and 4$as$ may be photodiodes, for example. The O/E converter 4$st$ receives the Stokes light ST output from one output end of the optical branching device 2. The O/E converter 4$as$ receives the anti-Stokes light AS output from the other output end of the optical branching device 2. The O/E converters 4$st$ and 4$as$ each output an electrical signal corresponding to the incident light.

The amplifiers 5$st$ and 5$as$ amplify electrical signals output from the O/E converters 4$st$ and 4$as$, respectively. The A/D converters 6$st$ and 6$as$ convert signals output from the amplifiers 5$st$ and 5$as$ into digital signals.

The calculation control unit 7 calculates the temperature from the intensity ratio between two components of the backward Raman scattered light, i.e., the intensity ratio between the Stokes light ST and the anti-Stokes light AS based on the digital signals output from the A/D converters 6$st$ and 6$as$. The calculation control unit 7 also identifies the point at which the backward Raman scattered light has occurred based on the time when the digital signal is received according to the backward Raman scattered light. Moreover, the calculation control unit 7 obtains the temperature distribution along the optical fiber 3 based on the calculated temperature and the identified point at which the backward Raman scattered light has occurred. Moreover, the calculation control unit 7 displays the obtained temperature distribution on a display (not shown). Note that the relationship between the intensity ratio and the temperature is pre-stored in the calculation control unit 7 in the form of a table or formulas. The calculation control unit 7 sends a timing signal to the light source 1 in order to control the timing for outputting an optical pulse from the light source 1.

The principle of the temperature distribution measurement will be described. Assume that the signal intensities of the Stokes light ST and the anti-Stokes light AS are each represented by a function of time with respect to a point in time at which light is emitted from the light source 1. Since the speed of light through the optical fiber 3 is known, this function can be substituted with a function of distance along the optical fiber 3 with respect to the light source 1. That is, this function can be regarded as being a function where the horizontal axis represents the distance and the vertical axis the intensities of the Stokes light ST and the anti-Stokes light AS occurring at different distance positions along the optical fiber, i.e., a distance distribution.

On the other hand, the anti-Stokes light intensity Ias and the Stokes light intensity Ist are both dependent on the temperature of the optical fiber 3. Moreover, the intensity ratio Ias/Ist therebetween is also dependent on the temperature of the optical fiber 3. Therefore, once the intensity ratio Ias/Ist is known, it is possible to know the position at which the backward Raman scattered light has occurred. Now, the intensity ratio Ias/Ist is a function of the distance x, i.e., Ias(x)/Ist(x). Therefore, it is possible to obtain the temperature distribution T(x) along the optical fiber 3 based on the intensity ratio Ias(x)/Ist(x).

FIG. 1 is a graph showing an example optical fiber temperature-loss characteristic. In FIG. 1, solid line A represents the actual measurement of the optical fiber loss at different temperatures. Solid line A also contains DTS noise. Broken line B is a straight line obtained by least squares approximation of solid line A. Broken line B represents an example temperature-loss characteristic of an optical fiber with reduced DTS noise. If the temperature of the optical fiber is known, it is possible to simply correct the temperature (loss) based on FIG. 1. With a DTS, however, an unknown temperature distribution is measured, and the temperature correction is therefore not easy.

As shown in FIG. 2, the calculation control unit 7 of the present measurement device includes a temperature correction unit 71 incorporated therein. The temperature correction unit 71 corrects the temperature distribution obtained by the calculation control unit 7 by using the temperature dependence of the loss difference between the Stokes light and the anti-Stokes light of backward Raman scattered light. Note that the temperature correction unit 71 may be provided, as necessary, as a functional block that is independent of the calculation control unit 7.

Figure 3:
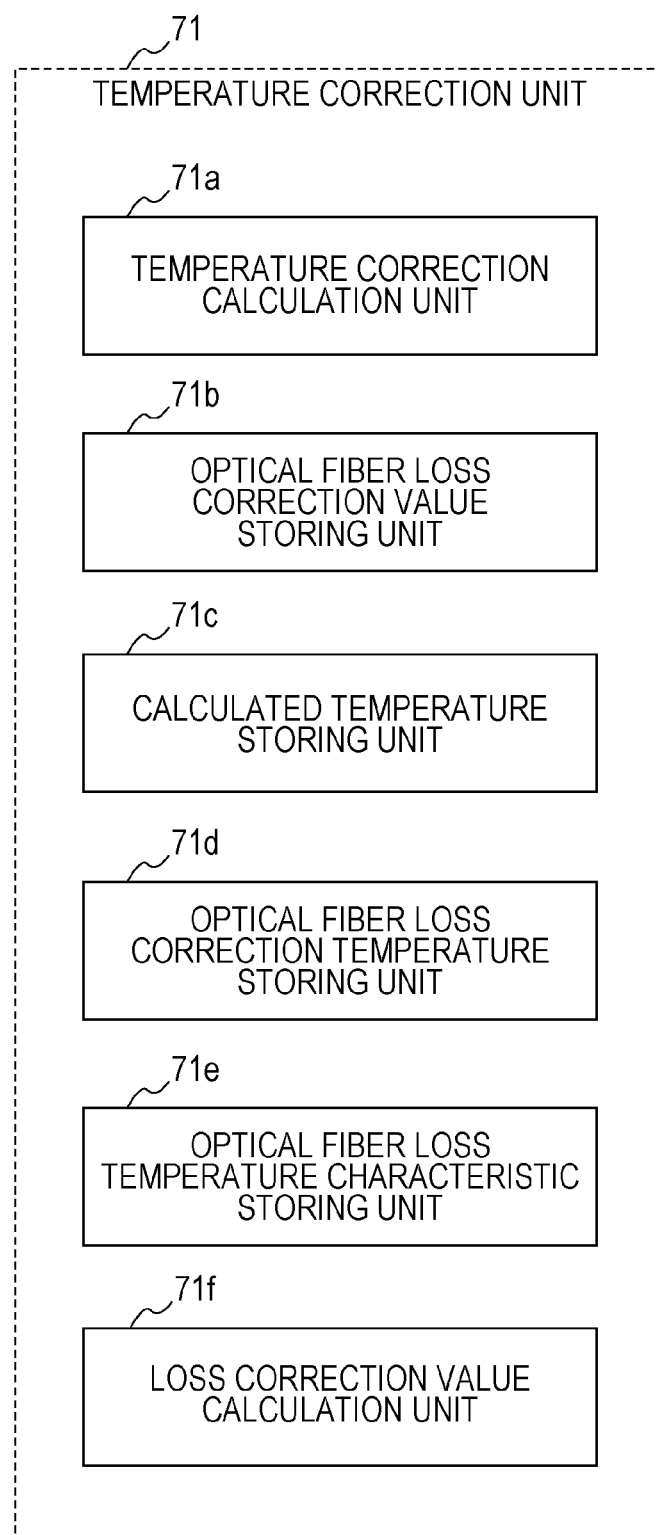
FIG. 3 is a block diagram showing a specific example of a temperature correction unit.

FIG. 3 is a block diagram showing a specific example of the temperature correction unit 71. As shown in FIG. 3, the temperature correction unit 71 includes a temperature correction calculation unit 71a, an optical fiber loss correction value storing unit 71b, a calculated temperature storing unit 71c, an optical fiber loss correction temperature storing unit 71d, an optical fiber loss temperature characteristic storing unit 71e, and a loss correction value calculation unit 71f.

The temperature correction calculation unit 71a calculates (obtains) the temperature distribution after the temperature correction (including T' to be described below, for example) by correcting the temperature distribution along the optical fiber 3 calculated by the calculation control unit 7 based on a parameter pre-stored in the optical fiber loss correction value storing unit 71b. The temperature correction calculation unit 71a stores the calculation result in the calculated temperature storing unit 71c. Note that the parameter pre-stored in the optical fiber loss correction value storing unit 71b is a loss correction value of the optical fiber 3 (e.g., an optical fiber loss value at a certain temperature) obtained by the calculation control unit 7, for example, with an ordinary measurement method.

The optical fiber loss correction temperature storing unit 71d has, stored therein, the optical fiber temperature value (e.g., $T_0$ to be described below) at a point in time when the loss correction value of the optical fiber 3 is obtained by an ordinary measurement method.

The optical fiber loss temperature characteristic storing unit 71e has, stored therein, the temperature characteristic of the loss value (e.g., a) to be described below) of the optical fiber 3 used. The temperature characteristic of the loss value of the optical fiber 3 may be, for example, the temperature characteristic of the loss value of a typical optical fiber.

The loss correction value calculation unit 71f performs the temperature correction calculation by using the temperature distribution value stored in the calculated temperature storing unit 71c, a parameter stored in the optical fiber loss correction temperature storing unit 71d, and a parameter stored in the optical fiber loss temperature characteristic storing unit 71e. That is, the loss correction value calculation unit 71f corrects the temperature distribution using the temperature dependence of the loss difference between the Stokes light and the anti-Stokes light based on the temperature distribution corrected by the temperature correction calculation unit 71a, the temperature of the optical fiber (3) at a point in time when the loss correction value of the optical fiber (3) is obtained, and the temperature characteristic of the loss value of the optical fiber (3).

Figure 4:
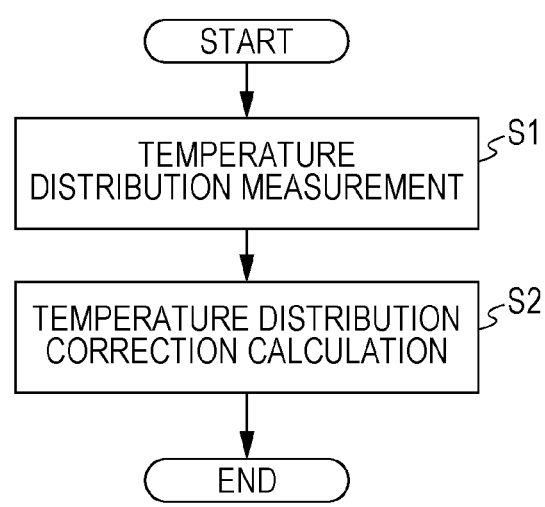
FIG. 4 is a flow chart showing the flow of an operation of an optical fiber temperature distribution measuring device according to an embodiment.

FIG. 4 is a flow chart showing the flow of an operation of the present measurement device. First, the calculation control unit 7 obtains the temperature distribution along the optical fiber 3 by an ordinary measurement method (step S1). Then, the temperature correction unit 71 performs the correction calculation for the measured temperature distribution (step S2).

Below is the temperature distribution correction calculation.

$$T=[-(1/T'-a*A*T_0)+\sqrt{\{(1/T'-a*A*T_0)^2+4*a*A*L\}}]/(2*a*A*L) \qquad (1)$$

T: Temperature (actual temperature) [K] after temperature correction of portion of optical fiber 3 at distance L T': Temperature measurement value [K] of portion of optical fiber 3 at distance L obtained by ordinary method a: Constant of temperature correction calculation [dB/km/° C.$^2$]

A: Constant, k/(10*C*v*log(e))

k: Boltzmann constant

C: Speed of light v: Shift wave number e: Base of natural logarithm

L: Distance length [km] of optical fiber 3

$T_0$: Temperature [K] of optical fiber at point in time when temperature correction of optical fiber 3 is performed (when loss correction value of optical fiber 3 is obtained)

A method for obtaining Expression (1) will now be described.

Typically, the temperature calculation at a DTS is represented by Expression (2) below.

$$1/T = 1/Tref - A(R(T) - Rref) \quad (2)$$

T: Actual temperature [K] of object being measured
Tref: Temperature [K] of temperature reference portion
R(T): Intensity ratio [dB] between ST light and AS light of object being measured
Rref: Intensity ratio [dB] between ST light and AS light of temperature reference portion
A: Constant, $k/(10*C*v*\log(e))$ Typically, the loss difference between the Stokes light ST and the anti-Stokes light AS is simply regarded as the loss value of the optical fiber at a certain temperature. However, the loss value (loss correction value) of the optical fiber 3 varies depending on the temperature of the optical fiber 3, as shown in FIG. 7. Therefore, the loss difference between the Stokes light ST and the anti-Stokes light AS is considered to also vary depending on the temperature of the optical fiber 3.

Consider a case where the temperature dependence α [dB/km/° C.] of the loss difference between the Stokes light ST and the anti-Stokes light AS is approximated to a straight line as shown below.

$$\alpha = (a*T + b)$$

In this case, the loss difference Loss(T,L) of which the distance L [km] and the temperature T [K] are parameters is represented by Expression (3) below.

$$Loss(T,L) = (a*T + b)*L \text{ [dB]} \quad (3)$$

where a and b are constants.

The DTS measured temperature T' [K] is represented by Expression (4) below based on Expressions (2) and (3).

$$1/T' = 1/Tref - A(R(T) + Loss(T,L) - Rref) \quad (4)$$

Where the temperature correction (optical fiber loss correction) is performed in advance using $T_0$ [K], Expressions (5) and (6) below are used.

$$1/T' = 1/Tref - A(R(T) + Loss(T,L) - Loss(T_0,L) - Rref) \quad (5)$$

$$1/T = 1/Tref - A(R(T) - Rref) \quad (6)$$

Then, subtracting Expression (6) from Expression (5) yields Expression (7).

$$1/T' - 1/T = A(-Loss(T,L) + Loss(T_0,L)) = A(-a*T*L + a*T_0*L) \quad (7)$$

Rearranging Expression (7) yields Expression (8) below.

$$a*A*L*T'^2 + (1/T' - a*A*L*T_0)*T - 1 = 0 \quad (8)$$

Solving Expression (8) for T yields Expression (1).

Since Expression (8) is a quadratic equation, there are two solutions. Of these two solutions, the real solution shown in Expression (1) is used.

Note that since the calculation of Expression (1) is complicated, an approximate value may be obtained by using a simplified equation shown below.

$$T = T' - 1/((1/T) + A*(Loss(T',L) + \Delta Loss)) \quad (9)$$

ΔLoss: Typical loss value of optical fiber 3 (loss difference between Stokes light ST and anti-Stokes light AS)

Figure 5:
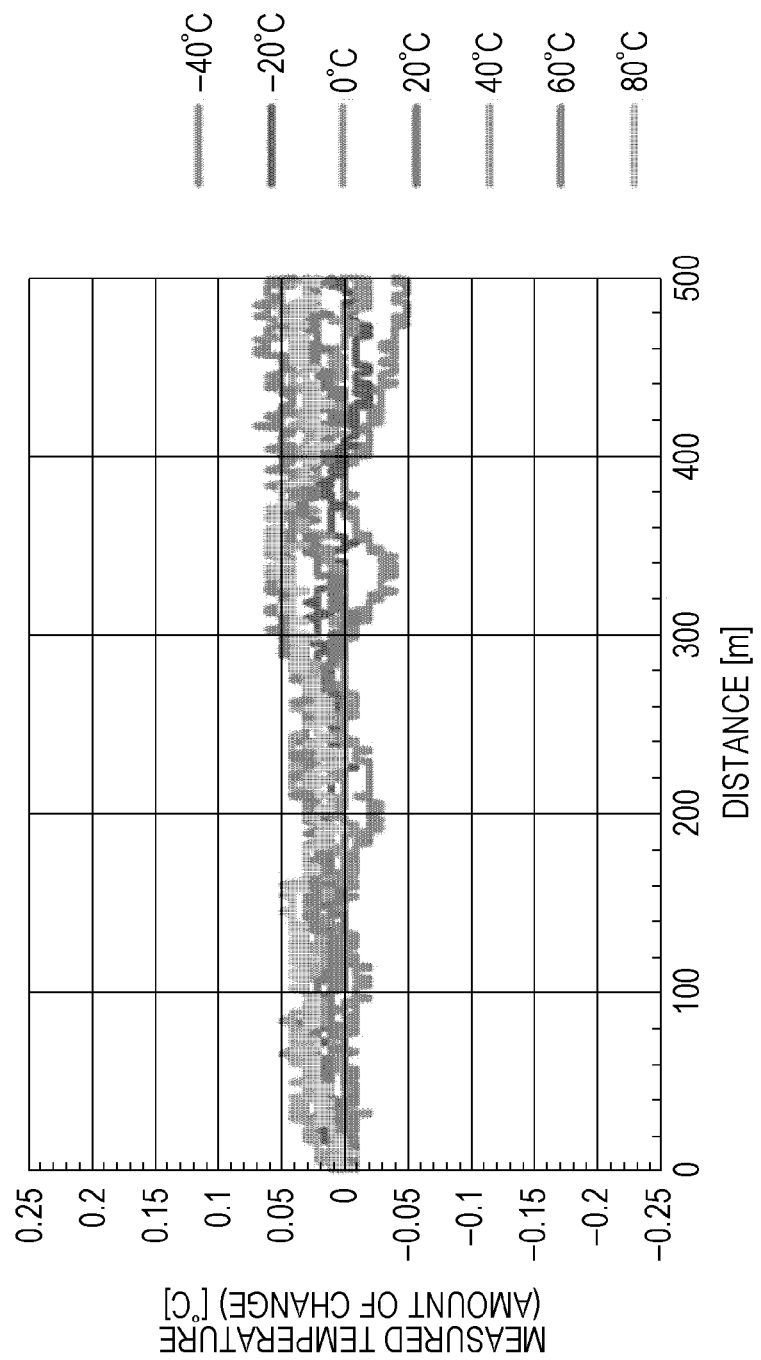
FIG. 5 is a graph showing an example temperature distribution measurement performed by an optical fiber temperature distribution measuring device according to an embodiment.

FIG. 5 is a graph showing an example temperature distribution measurement performed by the DTS (the present measurement device) shown in FIG. 2. FIG. 5 is enlarged along its vertical axis, as is FIG. 7. The temperature fluctuation of the temperature distribution waveform shown in FIG. 7 is 0.2° C. In contrast, the temperature fluctuation of the temperature distribution waveform shown in FIG. 5 obtained by using the DTS shown in FIG. 2 is improved to 0.05° C.

Note that the present embodiment has been directed to a time domain-type device using the intensity ratio of backward Raman scattered light, as an example. The technique of the present disclosure is also applicable to frequency sweep-type devices.

As described above, with the technique of the present disclosure, it is possible to realize an optical fiber temperature distribution measuring device capable of simplifying the temperature correcting process and performing a high-precision temperature correction by appropriately grasping the loss along the optical fiber 3.

Note that the member for carrying out the calculation of Expression (1) or Expression (9) may be the temperature correction unit 71 or may be the loss correction value calculation unit 71f.

In the present embodiment, the calculation control unit 7 obtains the temperature distribution along the optical fiber 3, and the temperature correction calculation unit 71a obtains the temperature distribution after the temperature correction by correcting the temperature distribution based on a parameter pre-stored in the optical fiber loss correction value storing unit 71b. Alternatively, the temperature correction calculation unit 71a may obtain the temperature distribution along the fiber 3, and may obtain the temperature distribution after the temperature correction by correcting the temperature distribution based on a parameter pre-stored in the optical fiber loss correction value storing unit 71b.

T' described above may be the temperature distribution along the optical fiber 3 calculated by the calculation control unit 7 or the temperature correction calculation unit 71a.

An embodiment of the present disclosure can be said to relate to an optical fiber temperature distribution measuring device using an optical fiber as a sensor where backward Raman scattered light is used, and specifically to an improvement to the temperature correction.

The calculation control unit 7 may calculate the temperature from the intensity ratio between two components of backscattered light, i.e., the Stokes light ST and the anti-Stokes light AS, based on the digital signals output from the A/D converters 6st and 6as, and may display, on a display unit (not shown), the temperature distribution along the optical fiber 3 obtained based on time-series data of the calculated temperature.

The optical fiber temperature distribution measuring device of the present embodiment may be any of first to third optical fiber temperature distribution measuring devices below.

A first optical fiber temperature distribution measuring device is an optical fiber temperature distribution measuring device using an optical fiber as a sensor, the optical fiber temperature distribution measuring device configured to measure a temperature distribution along the optical fiber by utilizing Raman backscattered light, the optical fiber temperature distribution measuring device including loss difference temperature dependence correction unit for correcting temperature dependence of a loss difference between Stokes light and anti-Stokes light.

In a second optical fiber temperature distribution measuring device according to the first optical fiber temperature distribution measuring device, the loss difference temperature dependence correction unit includes a unit for storing a temperature at a point in time when loss correction of the optical fiber is performed.

In a third optical fiber temperature distribution measuring device according to the first optical fiber temperature distribution measuring device, the loss difference temperature dependence correction unit includes a unit for pre-storing a loss temperature characteristic of a typical optical fiber therein as an initial value.

With the first to third optical fiber temperature distribution measuring devices, it is possible to simplify the temperature correcting process and to perform a high-precision temperature correction.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical fiber temperature distribution measuring device comprising:
    an optical fiber as a sensor;
    a calculation control unit, coupled to the optical fiber, for measuring a temperature distribution along the entire length of the optical fiber based on an intensity ratio between Stokes light and anti-Stokes light of backward Raman scattered light from the optical fiber; and
    a temperature correction unit, coupled to the calculation control unit to obtain the temperature distribution, for correcting the temperature distribution based on a temperature dependence of a calculated loss difference, calculated by the temperature correction unit, between the Stokes light and the anti-Stokes light along the length of the optical fiber,
    wherein the temperature correction unit includes an optical fiber loss correction temperature storing unit for pre-storing a temperature value of the optical fiber,
    wherein the temperature correction unit includes an optical fiber loss temperature characteristic storing unit for pre-storing a temperature characteristic of the optical fiber which is a constant used in the temperature distribution correction calculation, and
    wherein the temperature correction unit corrects the temperature distribution based on the pre-stored temperature value and the pre-stored temperature characteristic.

2. The optical fiber temperature distribution measuring device according to claim 1, wherein
    the temperature correction unit further includes:
    an optical fiber loss correction value storing unit for pre-storing a loss correction value of the optical fiber; and
    a temperature correction calculation unit for correcting the temperature distribution determined by the calculation control unit by using the loss correction value of the optical fiber.

3. The optical fiber temperature distribution measuring device according to claim 2, wherein
    the temperature correction unit further includes a loss correction value calculation unit for correcting the temperature distribution by using the temperature dependence of the loss difference between the Stokes light and the anti-Stokes light based on the temperature of the optical fiber at the point in time when the loss correction value of the optical fiber is obtained, the temperature characteristic of the loss value of the optical fiber, and the temperature distribution corrected by the temperature correction calculation unit.

4. The optical fiber temperature distribution measuring device according to claim 1, further comprising
    an optical branching device for receiving the backward Raman scattered light and separating the backward Raman scattered light into the Stokes light and the anti-Stokes light.

5. The optical fiber temperature distribution measuring device according to claim 2, wherein the temperature correction unit further includes:
    a calculated temperature storing unit configured to store a calculation result of the temperature correction calculation unit; and
    a loss correction value calculation unit configured to perform a temperature correction calculation based on the calculated result stored in the calculated temperature storing unit, the pre-stored temperature value, and the pre-stored temperature characteristic.

* * * * *